J. R. GAMMETER.
MOLD OPENER.
APPLICATION FILED APR. 22, 1918.

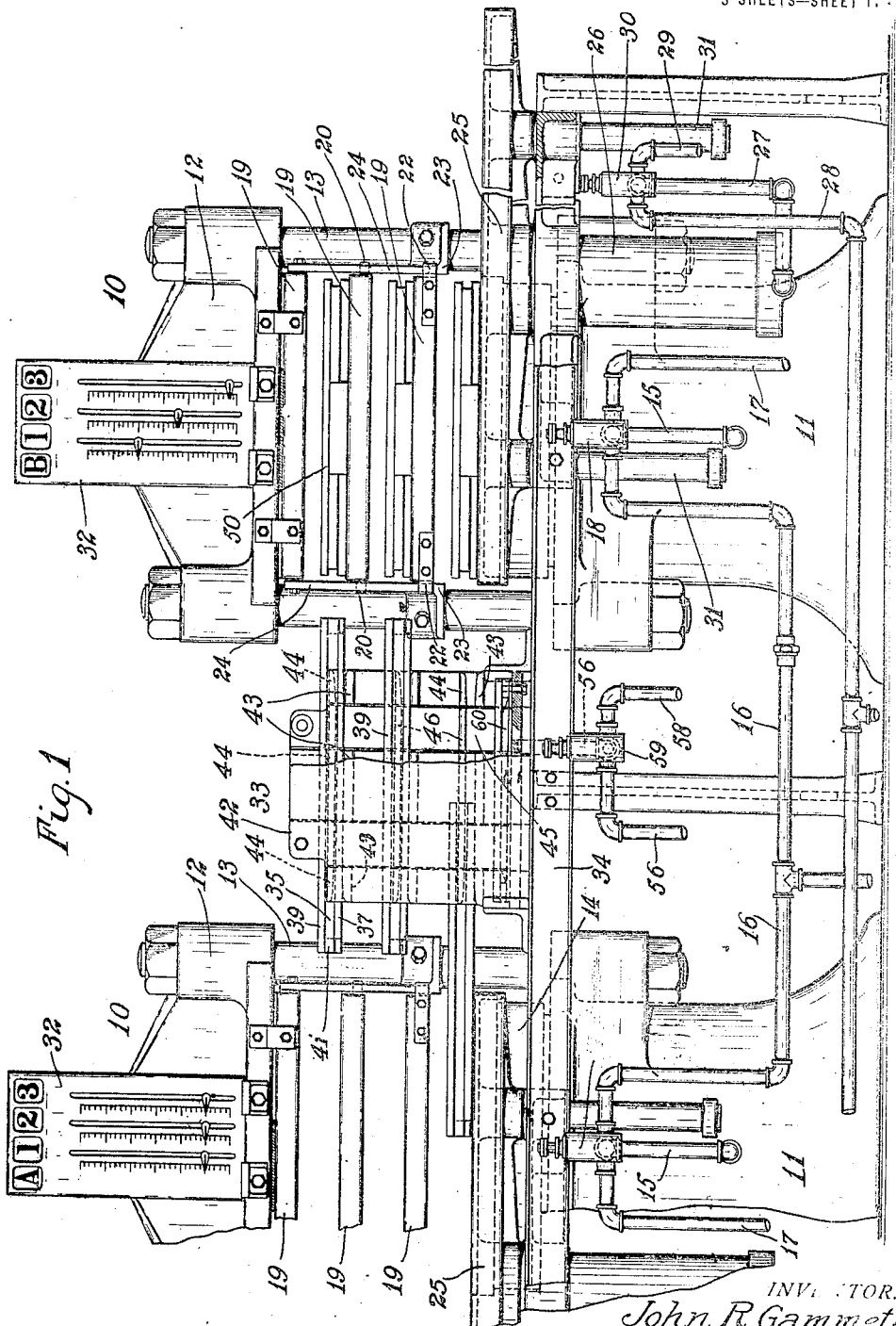

1,309,128.

Patented July 8, 1919.
3 SHEETS—SHEET 2.

INVENTOR.
John R. Gammeter
BY Robert M Pierson
ATTORNEY

J. R. GAMMETER.
MOLD OPENER.
APPLICATION FILED APR. 22, 1918.
1,309,128.
Patented July 8, 1919.
3 SHEETS—SHEET 3.
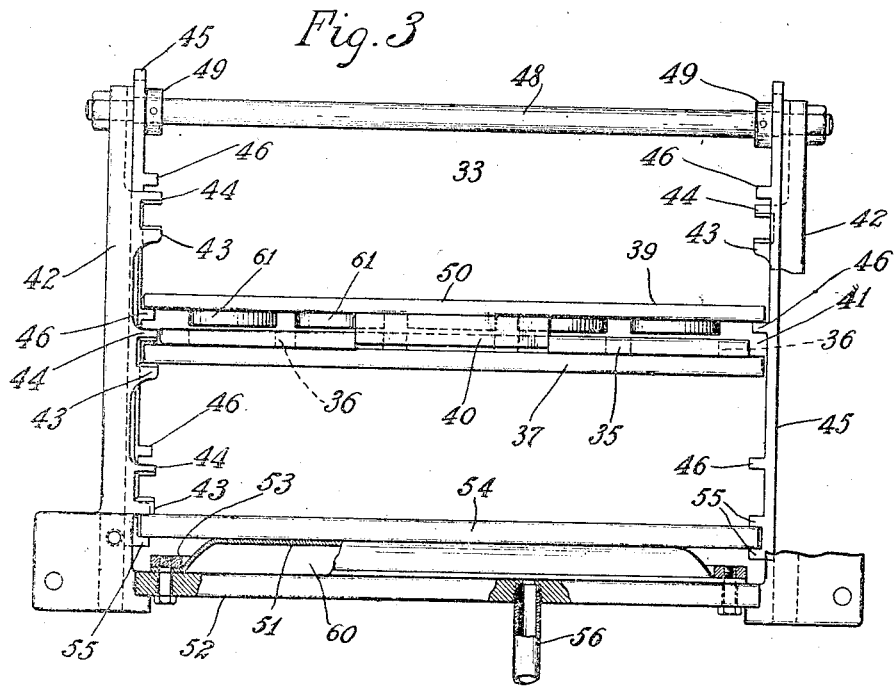
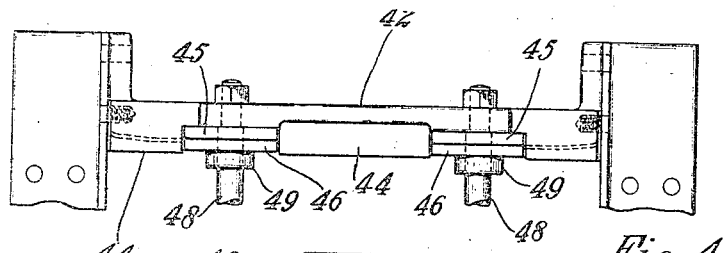
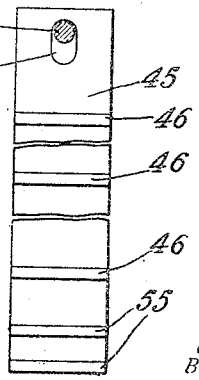
INVENTOR.
John R. Gammeter
BY
Robert M. Pierson
ATTORNEY

__UNITED STATES PATENT OFFICE.__

JOHN R. GAMMETER, OF AKRON, OHIO, ASSIGNOR TO THE B. F. GOODRICH COMPANY, OF NEW YORK, N. Y., A CORPORATION OF NEW YORK.

MOLD-OPENER.

1,309,128.

Specification of Letters Patent.

Patented July 8, 1919.

Application filed April 22, 1918. Serial No. 229,942.

*To all whom it may concern:*

Be it known that I, JOHN R. GAMMETER, a citizen of the United States, residing at Akron, in the county of Summit and State of Ohio, have invented a certain new and useful Mold-Opener, of which the following is a specification.

This invention relates to means for opening molds such as the multiple-cavity molds employed in vulcanizing rubber heels and similar articles, and its principal objects are to effect a saving of time and labor and to enable the finished articles to be extracted by the operation of opening the mold. A further object is to provide a useful combination between such a mold-opener and one or more vulcanizing presses.

Of the accompanying drawings,

Figure 1 is a front elevation, partly in section, of a mold opener made according to my invention and arranged in combination with a pair of vulcanizing presses which are alternately served by the opener.

Fig. 3 is a side elevation of the mold-opener, partly in section.

Fig. 4 is a plan view of one end thereof.

Fig. 5 is a face view of one of the rack plates, partly broken away.

Figure 6:
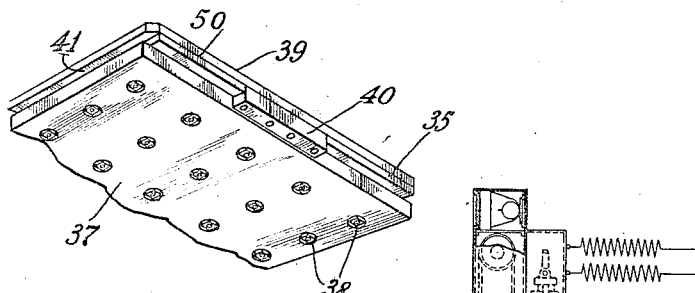
Fig. 6 is a partial perspective view showing the under side of one of the molds.

10, 10 are a pair of vulcanizing presses of the hot-plate type, each comprising a base formed as a hydraulic cylinder 11, a head 12 connected therewith by tie-rods 13 and forming the fixed platen, and a movable platen 14 carried by the ram or plunger of the hydraulic cylinder. Suitable pipe connections 15, 16, 17 and valves 18 are provided for charging and discharging the cylinders 11. Each press is provided with a series of hot-plates 19, 19, here shown as four in number, giving three mold compartments, the upper and lower plates being carried respectively by the fixed and movable platens 12, 14; the rise of the movable platen serving to crowd the stack of hot-plates and molds together, and its descent allowing the compartments to open so that the molds may be inserted and removed. The hot-plates are provided with the usual steam connections (not shown).

Figure 2:
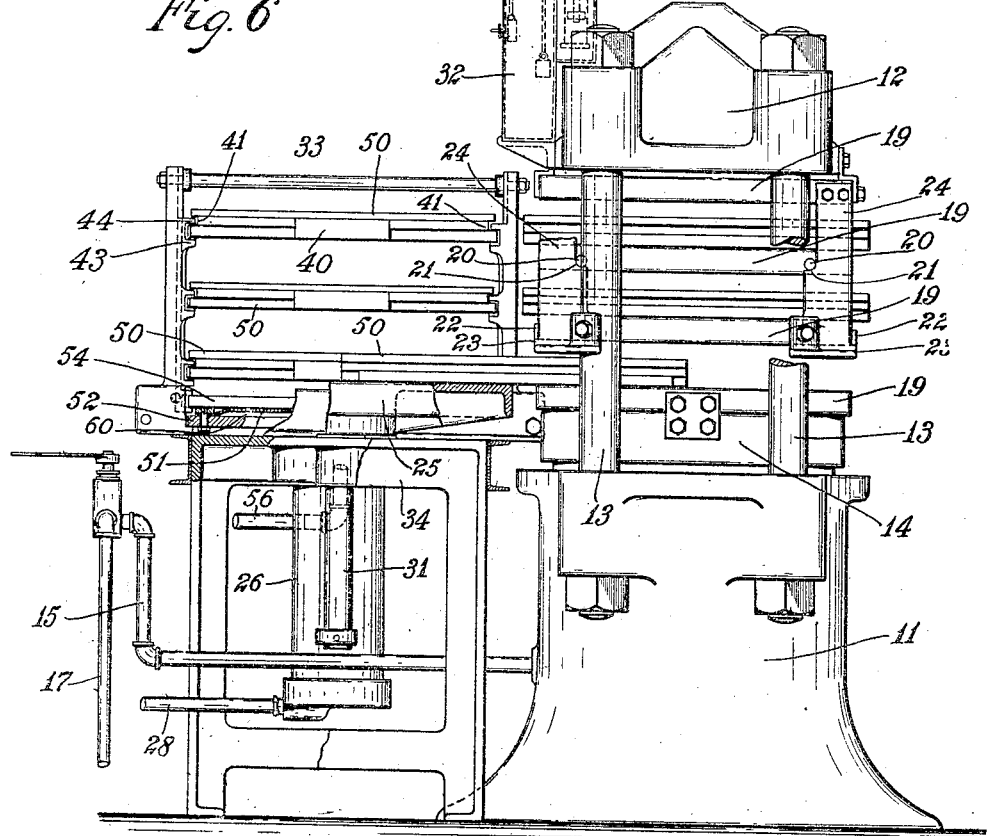
Fig. 2 is a side elevation of the apparatus, partly broken away.

When the press is open, as represented in Figs. 1 and 2, the intermediate hot-plates are supported at the desired heights by means of suitable pairs of stops 20, 21 and 22, 23 on said plates and on stationary frame-plates 24 respectively.

In front of each press is mounted an elevator platform 25 carried by the ram of a hydraulic cylinder 26 provided with supply and discharge piping 27, 28, 29 and a controlling valve 30. This platform is long enough to cover the space in front of the mold stack and also to extend to one side to provide a supporting surface while discharging and refilling the opened molds. The ends of the platform are steadied by vertical guide-rods 31.

Each of the presses is preferably provided with an indicator 32 for timing the cures in the respective mold compartments; but this indicator forms no part of my present invention.

The mold-opener 33 is mounted in front of the space between the two presses 10 upon a longitudinal frame 34 which also supports the two elevators. It has three parallel compartments, which, as shown, stand at the levels of the corresponding three compartments of the two presses, so that the several molds, supported at the proper heights by the elevator platforms 25, can be slid horizontally from the inner ends of said platforms into the corresponding compartments of the mold-opener.

Heel molds are commonly made of a middle apertured plate and separable top and bottom cover plates, in order to facilitate the filling and discharging of the mold cavities, but this construction has the disadvantage of forming rands or fins of excess rubber on both the upper and lower edges of the molded articles, the removal of which constitutes an item of expense in manufacture. I prefer permanently to unite the middle and bottom plates of the mold 50 so that only a single rand is formed, namely on the upper edge, thereby decreasing the trimming expense and at the same time facilitating the removal of the finished articles in accordance with the mode of operation of my improved mold opener. Accordingly, the middle mold plate 35, which is provided with the usual apertures forming the sides of the mold cavities 36, is permanently attached to the bottom mold plate 37 by means of the bolts 38 seen in Fig. 6, which screw into the solid parts of the middle plate 35, the two together constituting the mold body. 39 is the removable top or cover plate of the mold, and 40, 40, are guide blocks on the ends of the cover-plate working in suitable guide-ways on the mold-body for properly registering the cover plate therewith. The middle plate is somewhat shorter from front to rear than the top and bottom plates, so that grooves 41 are formed in the front and rear edges of the mold.

The mold opener includes front and back vertical frame plates 42 each formed with fixed rack jaws 43, 44 arranged in three vertical and three horizontal rows as seen in Figs. 1 and 4, there being two vertical spaces or grooves on each plate between these vertical rows in which slide a pair of movable rack or lifter plates 45, each having three flanges 46 for insertion under the cover plates 39 of the molds. These alternating vertical rows give an arrangement in which each lifter plate is flanked by two series of fixed jaws, or the middle series of fixed jaws is flanked by two lifter plates, thus balancing the pressures on the mold members. The upper ends of the lifter plates are formed with slots 47 through which pass a pair of horizontal tie-rods 48 connecting the upper ends of the frame plates 42, and said plates 45 are retained in place at their upper ends by means of collars 49 pinned to the tie-rods. Vertical movement is imparted to the lifter plates 45 by means of a flexible, convex diaphragm 51 clamped to a bottom plate 52 by a ring 53, and bearing against a follower plate 54 whose front and rear edges are inserted between pairs of jaws 55 on the lower ends of the plates 45. Hydraulic piping 56, 57, 58 and a controlling valve 59 are provided for charging and discharging the diaphragm chamber 60.

In the working of this apparatus there are supposed to be two operators (when two presses are employed), each operating his press on the system of overlapping cures,—that is, if the curing period is twelve minutes, for example, the three individual molds will be placed in and removed from the corresponding press compartments four minutes apart, the two molds whose period is incomplete remaining in the press when the latter is momentarily opened for the substitution of a fresh mold for the fully-cured one. Preferably also the two operators will have their press-opening periods two minutes apart so that they can alternate in the use of the mold opener. Each operator has four molds to work with. Assuming that the operator at the right, for example, is ready to change and open a mold, he elevates his platform 25 to the proper level by using the control valve 30, opens the press by means of the control valve 18, withdraws the finished mold and immediately slides it into the compartment at the same level in the mold opener 33 while the diaphragm chamber 60 is in a discharged condition, substitutes an uncured mold which he has prepared and placed on the extended end of the platform, then closes the vulcanizing press, and operates the opener 33 by admission of hydraulic pressure to said diaphragm chamber 60. In entering the mold opener, the projecting front and rear edges or flanges of the bottom mold plate 37 will enter the spaces between the stationary rack jaws 43, 44 in two of the opposite horizontal rows of said jaws, the lower jaws 43 at first supporting the weight of the mold and the upper ones 44 thereafter holding the mold body stationary while the cover plate is lifted off. Upon admitting hydraulic pressure to the diaphragm chamber, the lifter plates 45 will be elevated as shown in Fig. 3, and the flanges 46 on said plates, engaging under the projecting front and rear edges or flanges of the cover plate 39, will lift said plate clear of the mold body. The finished heels 61 are shown adhering to the cover. To produce this adhesion, the upper surfaces of the uncured heel blanks, after they are inserted in the mold cavities 36, are preferably wiped with benzol or other suitable rubber solvent to increase their tackiness, while the bottoms and sides of the mold cavities are treated with soapy water or other suitable lubricant in the usual manner before the blanks are inserted, in order to facilitate the withdrawal of the finished heels. The operator then separately withdraws the mold cover and body from the mold opener, removes the finished heels from the cover plate, using the platform 25 as a support, prepares and re-charges the mold and is then ready to repeat the foregoing series of operations at another compartment of his press and of the mold opener. In the meantime, the operator of the left-hand press is going through a similar series of operations at such an interval as to make his use of the mold opener alternate with that of the right-hand operator. One of the molds is shown in Fig. 1 sliding from the left-hand platform into or out of the lower compartment in the mold opener, and in Fig. 2 the corresponding mold is shown sliding into or out of one of the presses.

It is, of course, possible to employ the mold opener in conjunction with only a single vulcanizing press or to use it in any other way for which it may be found adapted, and it will be further understood that various changes in construction may be made without departing from my invention.

The sticking of the finished heels to the under side of the cover plate as the latter is lifted off is in considerable degree due to the fact that said plate remains parallel to the mold body during the lifting thereof, so that the heels move in straight lines perpendicular to the dividing plane of the mold and do not tend to catch on the edges of the cavities. This method is in sharp contrast with the usual mode of opening rubber molds, which consists in prying up one edge of the cover with a bar, so as to produce a progressive separation between the mold and the work, and while the improved method requires more power and is best performed in a machine of the character described, a considerable saving in time and labor is thereby realized.

I claim:

1. In combination, a mold-opener having relatively-movable members for engaging a mold body and cover respectively, to separate the two, and a flat, portable mold composed of separable parts and adapted to be moved as an individual unit into and out of operative relation to said members by sliding the mold in its own plane.

2. In combination, a portable mold adapted to be handled as an individual unit and comprising a body and a removable cover each having projecting members on opposite edges, and a mold-opener having complemental fixed and movable members positioned in operative relation to said edge members by a sliding movement of the mold for separating the mold cover from the body thereof.

3. A mold opener having fixed and movable members forming a series of parallel mold-receiving compartments, and means for actuating said movable members in all the compartments simultaneously to separate the body and cover of a mold in any of said compartments.

4. A mold opener having fixed and movable members for engaging respectively the body and cover of a mold to separate the two, one of said members of one kind being flanked by two of said members of the other kind.

5. A mold opener having on each of two opposite sides thereof fixed and movable members for engaging, respectively, the body and cover of a mold, to open the latter, one of said members of one kind on each side of the opener being arranged between two of said members of the other kind, and means for actuating said movable members.

6. In combination, a mold comprising a body having opposite edge flanges, a cover therefor having opposite edge flanges or extensions separated from the body flanges by a pair of grooves, and a mold opener having opposite pairs of fixed jaws to receive the body flanges, and opposite lifter flanges adapted to enter said grooves and movable relatively to the fixed jaws to separate the mold cover from the body thereof.

7. A mold opener having on opposite sides a plurality of fixed and movable members forming a plurality of horizontal mold compartments, the members of one kind on each side being arranged in a vertical row flanked by two vertical rows of members of the other kind, said members adapted to engage, respectively, the bodies and covers of molds to open the latter, and means for imparting a lifting movement to the movable members.

8. A mold opener having on each of two opposite sides a plurality of vertical rows of fixed jaws for engaging the bodies of molds adapted to be located horizontally at different heights in the opener, and a plurality of lifter plates located in the spaces between said vertical rows and provided with means for engaging the covers of the molds, together with means for simultaneously raising and lowering the several lifter plates on both sides.

9. In combination, a mold comprising a body and a removable cover, a mold-opener having body-engaging and cover-engaging members on each of two opposite sides, said cover-engaging members being formed on a pair of vertically-movable lifter plates, and fluid-pressure means for operating said lifter plates.

10. In combination, a mold-opener having fixed mold-body engaging members and vertically-movable mold-cover engaging members arranged in two sets on opposite sides of the opener, a pair of lifter plates carrying said mold-cover engaging members, a fluid-pressure chamber having a flexible diaphragm as its top wall, and a follower plate surmounting said diaphragm and connected with the lifter plates.

11. The combination of a vulcanizing press having a vertical tier of mold compartments, a mold opener having a vertical tier of mold compartments at corresponding levels, and an elevator platform adapted to be positioned at the different levels in mold-transferring relation to the compartments of the press and mold-opener.

12. The combination of a pair of spaced vulcanizing presses having mold compartments arranged in tiers at the same levels, and a mold opener alined with the space between the presses and having a tier of mold compartments at corresponding levels.

13. The combination of a pair of vulcanizing presses having mold compartments arranged in tiers at the same levels, a mold opener located substantially between said presses and having a tier of mold compartments located at corresponding levels, and a pair of elevator platforms adapted to be independently positioned at the different levels in mold-transferring relation to the compartments of the respective presses and the mold-opener.

14. In combination, a portable mold adapted to be handled as an individual unit and comprising a body formed with a molding cavity having bottom and sides permanently related and a cover separable from said body on a plane coinciding with one edge of the article to be molded, and a mold opener adapted to be operatively related with and separated from said mold by a sliding movement of the latter in its own plane, said opener having means for separating the mold cover from the body by a movement perpendicular to the plane of the mold.

15. The herein-described process of vulcanizing and extracting rubber heels and similar articles which comprises lubricating the pocket but not the cover of a suitably-constructed mold, so that the vulcanized article may be withdrawn from said pocket by its adhesion to the cover, molding and vulcanizing said article, and removing the cover from the body of the mold in a perpendicular path.

16. The method of extracting vulcanized rubber articles from multiple-cavity molds which consists in applying a rubber solvent to the tops of the blanks prior to vulcanization to cause their adhesion to the mold cover, and after vulcanization separating said cover from the mold body in a vertical path.

In testimony whereof I have hereunto set my hand this seventeenth day of April, 1918.

JOHN R. GAMMETER.